United States Patent [19]

Barrett et al.

[11] Patent Number: 5,727,129
[45] Date of Patent: Mar. 10, 1998

[54] NETWORK SYSTEM FOR PROFILING AND ACTIVELY FACILITATING USER ACTIVITIES

[75] Inventors: Robert Carl Barrett; Daniel Clark Kellem, both of San Jose; Paul Philip Maglio, Santa Cruz, all of Calif.

[73] Assignee: International Business Machines Corporation, Armonk, N.Y.

[21] Appl. No.: 659,100

[22] Filed: Jun. 4, 1996

[51] Int. Cl.$^6$ ............................................. G06F 3/00
[52] U.S. Cl. .......................... 395/12; 395/357; 395/353; 395/200.09
[58] Field of Search ................. 395/12, 1, 10, 395/326–358, 200.01, 200.02, 200.11, 200.08, 200.09

[56] References Cited

U.S. PATENT DOCUMENTS

| | | | |
|---|---|---|---|
| 4,931,950 | 6/1990 | Isle et al. | 395/12 X |
| 5,103,498 | 4/1992 | Lanier et al. | 395/12 X |
| 5,204,947 | 4/1993 | Bernstein et al. | 395/157 |
| 5,208,745 | 5/1993 | Quentin et al. | 395/12 X |
| 5,239,617 | 8/1993 | Gardner et al. | 395/12 |
| 5,297,249 | 3/1994 | Bernstein et al. | 395/156 |
| 5,333,237 | 7/1994 | Stefanopoulos et al. | 395/12 |
| 5,355,472 | 10/1994 | Lewis | 395/600 |
| 5,390,281 | 2/1995 | Luciw et al. | 395/12 |
| 5,506,937 | 4/1996 | Ford et al. | 395/12 |
| 5,560,011 | 9/1996 | Uyama | 395/12 X |

OTHER PUBLICATIONS

O'Leary, "AI and Navigation on the Internet and Intranet", IEEE Expert, pp. 8–10, Apr. 1996.
Chang et al., "Intelligent Database Retrieval By Visual Reasoning", IEEE, pp. 459–464, 1990.
Passani et al., "Learning from Hotlists and Coldlists: Towards a WWW information Filtering and Seeking Agent", IEEE, pp. 492–495, 1995.
Story et al., "The RightPages Image-Based Electronic Library for Altering and Browsing", IEEE, pp. 17–26, 1992.
M. Balabanovic & Y. Shoham, Learning Information Retrieval Agents: Experiments with Automated Web Browsing, Dept. of Computer Science, Stanford Univ., California pp. 13–17 (marko@cs.stanford.edu).
R. Armstrong, D. Freitag, T. Joachims, & T. Mitchell, WebWatcher: A Learning Apprentice for the World Wide Web, School of Computer Science, Carnegie Mellon Univ. 1/20/95, pp. 6–12. AAAI Spring Symposium, Mar. 27–29, 1995. Stanford Univ. Info Gathering for Heterogeneous, Distributed Environment.

*Primary Examiner*—John E. Breene
*Attorney, Agent, or Firm*—James C. Pintner

[57] ABSTRACT

A system and method are provided for use with an communication and information network, such at the Internet World Wide Web, for assisting a user in accessing information stored at remote network sites based on the user's past history of network usage. An archive is maintained of remote sites accessed and instances in which the same remote sites are accessed in sequence. Statistics regarding information such as the number of time a site has been accessed, and the times a given set of sites have been accessed in sequence, are maintained. This information may be displayed upon command. Based on this information, information items are identified which the user is predicted to be likely to want to access. This information is pre-downloaded, without express user command, so that if the user does enter a command, the response time is advantageously fast.

22 Claims, 11 Drawing Sheets

FIG. 9 http://past_state.6 http://past_state.5 http://past_state.2 http://past_state.4 http://past_state.3 http://past_state.1 http://present_state http://future_state_1 http://future_state_3 http://future_state_4 http://future_state_5 http://future_state_2 http://future_state_6

NETWORK SYSTEM FOR PROFILING AND ACTIVELY FACILITATING USER ACTIVITIES

FIELD OF THE INVENTION

The invention generally relates to the field of communication networks and architectures. More particularly, the invention relates to systems in which successive items of information from one or more remote locations are accessed. The invention has particular applicability to systems and methods for interfacing with the Internet/World Wide Web, in which the user downloads a succession of remote Web pages.

GLOSSARY OF TERMS USED

While dictionary meanings are also implied by certain terms used here, the following glossary of some terms may be useful.

Internet ("the Net"): The connection system that links computers worldwide in a network.

TCP/IP: Transmission Control Protocol/Internet Protocol. A packet switching scheme the Internet uses to chop, route, and reconstruct the data it handles, from e-mail to video.

World Wide Web (WWW, "the Web"): The Internet's application that lets people seeking information on the Internet switch from server to server and database to database by clicking on highlighted words or phrases of interest. An Internet Web server supports clients and provides information.

Home page: A multi-media table of contents that guides a Web user to stored information on the Internet.

Server: A machine (computer) which performs a task at the command of another machine ("client"). In the context of the present invention, a server's primary function is to facilitate distribution of stored information over the Web.

Client: A machine which provides commands to a server, and is serviced by the server. Typically, a client machine is operated by an end user, and functions responsive to user commands.

Web Browser: A program running on a user-operated client computer. When a user "surfs" the Web using a browser, the browser acts as an Internet tour guide, allowing the client machine to display pictorial desktops, directories and search tools supported by the server.

URL: Universal Resource Locator, a Web document version of an e-mail address, in character string form, which uniquely identifies a document, application, or tool available over the Web.

Hyperlink: A network addressing tool embedded in a user-understandable displayed and/or highlighted item, such as a word, phrase, icon or picture. A URL can be accessed by means of its corresponding Hyperlink. When a user on a client machine selects the highlighted hyperlink through the user interface, the underlying item is then retrieved to the client supporting a Web browser.

HTTP Hypertext transfer protocol: Hypertext transfer protocol. The character string "http:" at the beginning of a URL indicates that the document or file designated by the URL contains hyperlinks defined according to the HTTP.

HyperText Markup Language (HTML): HTML is the language used by Web servers to create and connect documents that are viewed by Web clients. HTML uses Hypertext documents. Other uses of Hypertext documents are described in the following U.S. Pat. Nos.:

Bernstein et al., 5,204,947, issued Apr. 20, 1993;
Bernstein et al., 5,297,249, issued Mar. 22, 1994; and
Lewis, 5,355,472, issued Oct. 11, 1994;
all of which are assigned to International Business Machines Corporation, and which are referenced herein.

BACKGROUND OF THE INVENTION

In recent years, the technology of multimedia storage and interactive accessing has converged with that of network communications technologies, to present exciting prospects for users who seek access to remotely stored multimedia information. Particularly exciting has been the recent prominence of the Internet and its progeny, the World Wide Web. The Internet and the Web have captured the public imagination as the so-called "information superhighway." Accessing information through the Web has become known by the metaphorical term "surfing the Web."

The Internet is not a single network, nor does it have any single owner or controller. Rather, the Internet is an unruly network of networks, a confederation of many different networks, public and private, big and small, whose human operators have agreed to connect to one another.

The composite network represented by these networks relies on no single transmission medium. Bi-directional communication can occur via satellite links, fiber-optic trunk lines, phone lines, cable TV wires, and local radio links. However, no other communication medium is quite as ubiquitous or easy to access as the telephone network. The number of Web users has exploded, largely due to the convenience of accessing the Internet by coupling home computers, through modems, to the telephone network. As a consequence, many aspects of the Internet and the Web, such as network communication architectures and protocols, have evolved based around the premise that the communication medium may be one of limited bandwidth, such as the telephone network.

To this point the Web has been used in industry predominately as a means of communication, advertisement, and placement of orders. The Web facilitates user access to information resources by letting the user jump from one Web page, or from one server, to another, simply by selecting a highlighted word, picture or icon (a program object representation) about which the user wants more information. The programming construct which makes this maneuver possible is known as a "hyperlink".

In order to explore the Web today, the user loads a special navigation program, called a "Web browser" onto his computer. A browser is a program which is particularly tailored for facilitating user requests for Web pages by implementing hyperlinks in a graphical environment.

There are a number of browsers presently in existence and in use. Common examples are the NetScape, Mosaic and IBM's Web Explorer browsers. Browsers allow a user of a client to access servers located throughout the world for information which is stored therein. The information is then provided to the client by the server by sending files or data packets to the requesting client from the server's storage resources.

Part of the functionality of a browser is to provide image or video data. Web still image or video information can be provided, through a suitably designed Web page or interface, to a user on a client machine. Still images can also be used as Hypertext-type links, selectable by the user, for invoking other functions. For instance, a user may run a video clip by selecting a still image.

A user of a Web browser who is researching a particular area of interest will often move from one home page, to another, to another, etc., by hyperlinking from each successive page to the next.

The user tends to develop a mental picture of his/her pathway through the Web, based on a recollection of the pages he/she has viewed. Often, the user will want to page rapidly backward, through pages already viewed, to reach a point where more than one hyperlink of interest was located, so that he/she can explore, in succession, where those links lead.

Existing Web browsers maintain records of sequences of pages previously viewed during a Web surfing session. Thus, if a user wants to return to a previously-viewed page, he/she can easily do so. For instance, IBM's WebExplorer displays right and left arrows to allow a user to scroll back through previously viewed pages, and forward to the most recent page. As long as the Web terminal has the memory capacity to cache the previously viewed Web pages, the previously viewed pages are recovered locally. Thus, the delay of reloading the page over the Web is avoided.

However, conventional Web browsers have been limited to a sequential recall of pages viewed during a given Web surfing session. There has been no utilization of repeated viewing patterns from previous sessions, either in general or with respect to a particular individual user.

Also, a user often will view the same Web page in successive Web surfing sessions, either to make repeated reference to information of continuing interest, or to monitor a Web page for updates. Conventional Web browsers have facilitated this repeated viewing by allowing a user to store pages of interest, by URL or otherwise, in a concise list. The user can then select pages directly from the list. This is sometimes referred to as a "hot list." IBM's WebExplorer browser calls it a "QuickList."

However, these lists are essentially passive tools. They help a user to access a desired, previously-viewed page more easily, but do not take an active role in presenting a user with pages he/she is likely to want to see, but has not expressly requested.

Many Web surfers merely "browse" the Web, that is, look at anything that strikes their fancy. On the other hand, some Web surfers may be said to be "searching", rather than browsing. These latter users have a goal in mind from the beginning, and do all of their surfing with that in mind. While users may make course corrections in their searching strategy, based on what they find, their basic goal remains unchanged.

For such searchers, the usefulness of the browser as a user interface may be enhanced if the browser has features that facilitate the searching process. Two papers, both published at the AAAI Spring Symposium, "Information Gathering from Heterogeneous Distributed Environment", Stanford Univ., Mar. 27-29, 1995, give examples of such features.

In Armstrong et al., "WebWatcher: A Learning Apprentice for the World Wide Web," School of Computer Science, Carnegie-Mellon Univ., Jan. 20, 1995, a Web browsing system is described which provides certain search-enhancing features.

This paper describes a Web browser having a feature for predicting which of several displayed hyperlinks are likely to be of interest to a user performing a purposeful search. The system highlights the hyperlinks of the predicted hyperlinks, and pre-fetches them, so that if a user selects a predicted hyperlink, the download process is at least partially under way already.

The system makes the prediction of which link is likely to be of interest based on a variety of factors, including the identity of the user. Facility is provided for entering a "goal", i.e., type of document (a paper, a home page, software, academic course information, etc.), author's name, subject matter, etc.

As part of the operating process, the user performs a training process, which is analogous to that used with neural networks. That is, a set of training search sequences were used, to develop a set of statistical results regarding what links users were likely to select from a given page. Several such methods are presented.

This technique has the drawback that it is based on the selections the user makes during the training searches, which are not necessarily good choices in view of what the user's needs are. The user might omit good choices unwittingly, or simply not find any genuinely good choices. Nevertheless, the system trains itself, using the "GIGO" (garbage in, garbage out) principle. Accordingly, this training process does not guarantee good results.

In the second paper, Balabanovic, et al., "Learning Information Retrieval Agents: Experiments with Automated Web Browsing", Dept. of Computer Sc., Stanford Univ., pp. 13-17, there is described another Web browsing system which, when searching, performs an evaluation using a search heuristic, and reports pages back to the user based on a ranking of satisfaction of the heuristic. An evaluation is made of the "interestingness," or unusualness, of a given word, with respect to a given document in a collection, based on the occurrence of the word in the document, and in other documents of the collection. This technique is used to determine which words are particularly interesting for which documents. The user's preferences are then compared with the interesting words of the various documents.

This system also has the drawback that it depends on timely continuous maintenance of the interesting word information for an ever-increasing number of Web pages. Thus, these prior art systems have in common the fact that they are based on the overall content of a set of information items, and that the objective is to search for information items not previously viewed.

Moreover, it places a particular emphasis on the particular subject matter being searched, so that a user who has a variety of interests may not be well served. The "goal" which is specified at the beginning of the session implies that the overall past experience of the user in prior Web surfing sessions is to be disregarded, even though it might have been relevant to the present searching objective. Neither of these approaches are directed to a situation in which a user wishes to take advantage of his/her own past experience.

From these examples, it will be seen that an interface between the user and the Web fails to provide certain types of functionality which could further aid the user in his/her Web surfing sessions.

It is foreseeable that Web browsers will continue to grow in sophistication and functionality to make it easier for a user to surf the Web. Accordingly, there is a need for a user interface which is free of these limitations, and which therefore would further enhance the features available to the user.

SUMMARY OF THE INVENTION

Accordingly, it is an object of the invention to provide functionality to a user, in conjunction with a Web surfing session, which has not been provided by conventional Web browsers.

More specifically, it is an object of the invention to provide search-related functionality which is more tailored to the particular user's interests and desires than has been achieved in conventional systems.

It is a further object of the invention to provide a system which takes advantage of the user's past usage, including individual pages visited and sequences of pages visited.

It is a further objective of the invention to facilitate access by the user between pages which were previously visited, without the necessity of visiting intermediate pages in between.

To achieve these and other objective, there is provided in accordance with the invention a communication system for facilitating communication between a user and a network of information resources at respective remote network nodes. The system comprises:

- a local node having a user interface program thereon, for allowing a user to interface with the network and request a download of information items from the information resources;
- a network interface coupled between the local node and the network;
- a user interface including (i) means for receiving user commends representative of user actions and (ii) means for displaying received network responses of network information for viewing by a user;
- means for recording a sequence of successive user actions and network responses;
- means for developing a profile of user activities based on the user actions and network responses monitored in the step of monitoring; and
- means for actively facilitating user activities based on the developed profile.

Since different users have different interests (utilize different browser features regularly or frequently, make different use of printer facilities, tend to view different sorts of Web information resources, etc.), the invention provides a user interface which is customized for a particular user, to reflect the user's interests.

The invention provides a layer of "intelligence," or active functionality, as distinct from the purely passive functionality provided by conventional browsers.

The invention "learns" from previous Web surfing activity, so that the user can more efficiently perform subsequent activities.

While the invention is disclosed as a method, i.e., in terms of flowcharts, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

Figure 1:
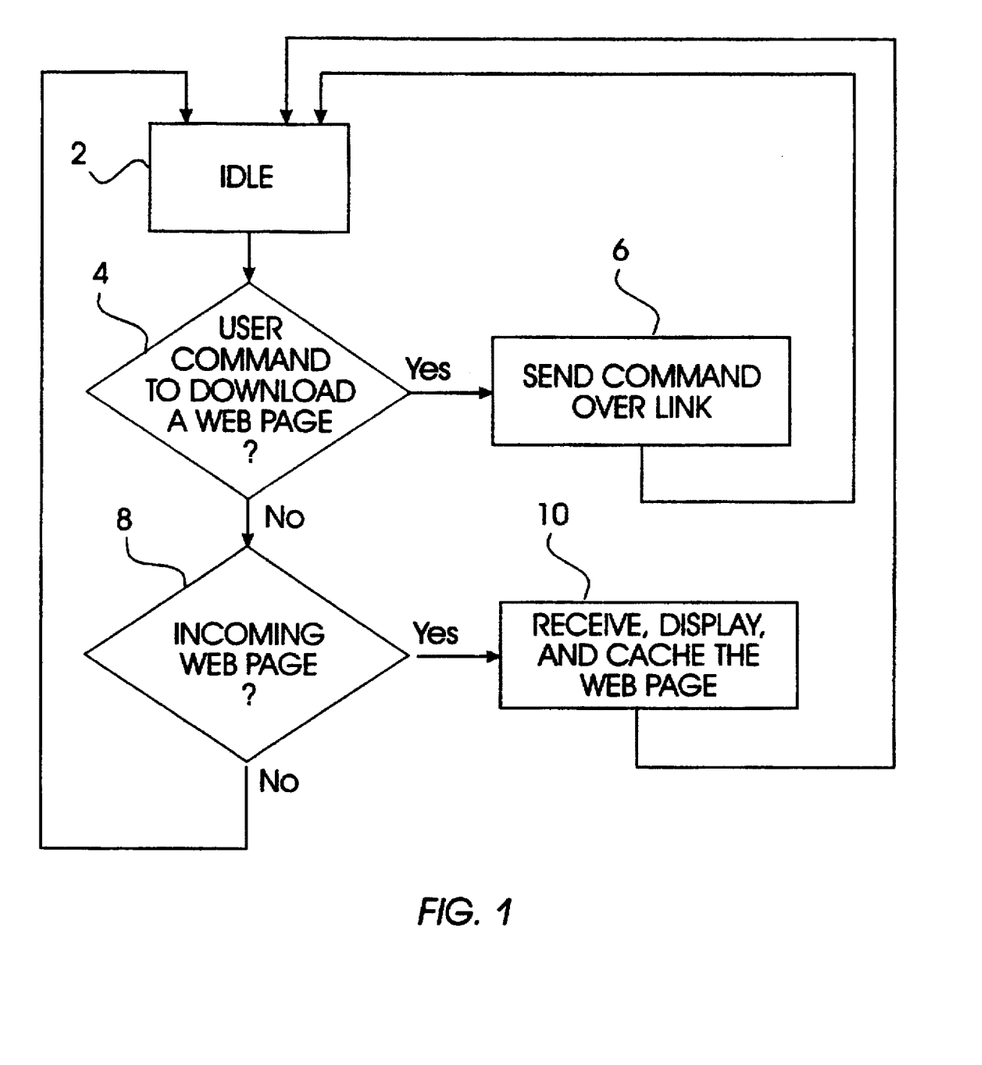
FIG. 1 is a high-level flowchart showing the general operation of a conventional Web browser.

FIG. 1 is a simplified high-level block diagram of a conventional Web browser. In an idle state 2, the browser performs all base-level operation, including maintaining a display, handling internal processing, etc. In step 4, if a user command to download a Web page, such as a mouse click on a hyperlink or a keyboard command entering a URL, is detected, a suitable HTTP command is sent over the link (step 6). If incoming information, such as a downloading Web page, is received (step 8), then the page is received, displayed, and (if appropriate), stored in a local cache for possible later redisplay (step 10).

In accordance with the invention, however, the detection of either a user command or incoming information engenders additional activity pertaining to the development of a profile of operations (described below), and to the notification of the user by means of display information, audio signals, and/or tactile feedback through user-manipulable interface devices such as IBM's TrackPoint III™ in-keyboard fingertip-manipulated pointing device.

Figure 2:
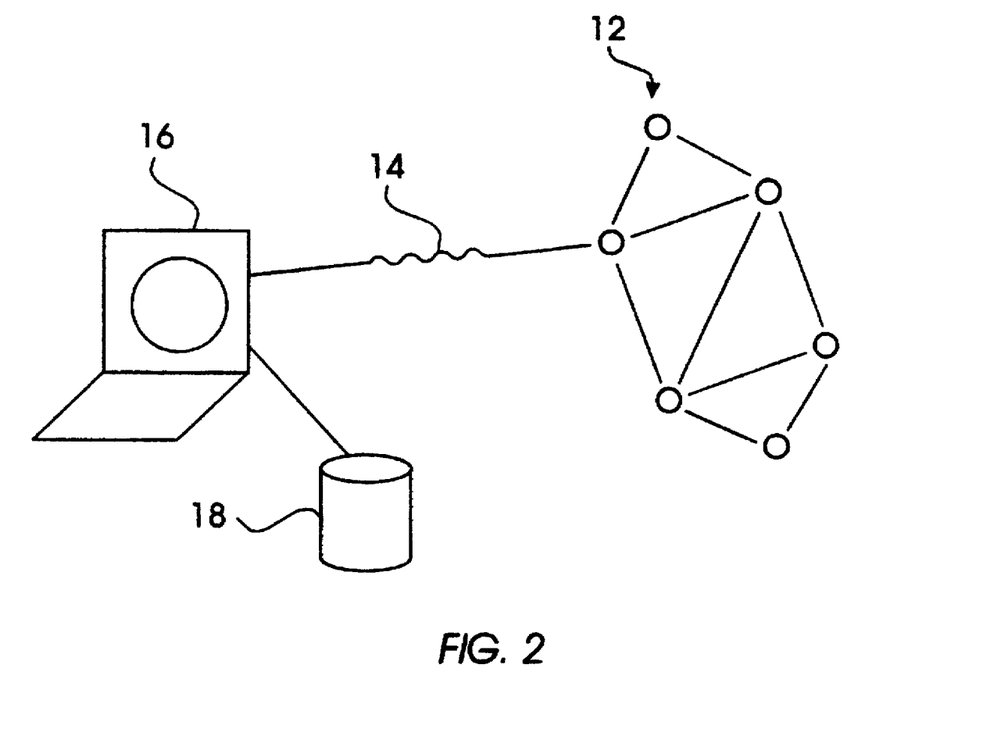
FIG. 2 is a high-level block diagram of a system in accordance with the invention.

FIG. 2 is a high-level block diagram of a system in accordance with the invention. A communication network such as the Internet, generally shown as 12, is coupled, through a link 14 such as the telephone network, to a local node 16. The network 12 includes numerous servers, storage repositories, communication links, etc. The general architecture of the Internet/World Wide Web is known, and will not be discussed in detail, beyond the extent to which it directly pertains to the invention.

The local node 16 is preferably a Web terminal or general purpose computer, including user interface equipment, such as a video display, a processor, and an executing Web browser program. In accordance with the invention, storage 18 is provided for storing the profile to be developed as continuing use of the system by a user establishes a history from which future predictions can be made.

Figure 3:
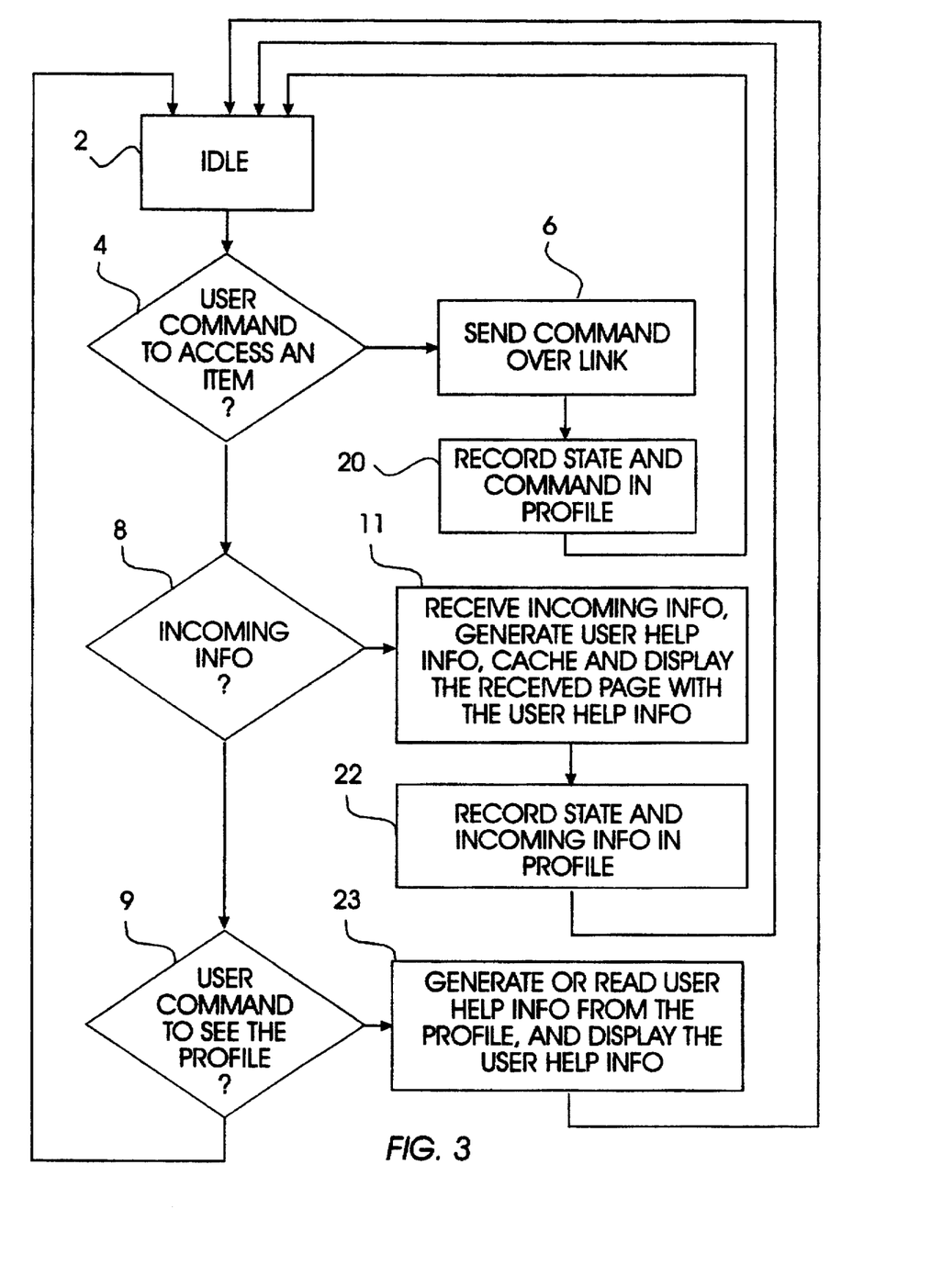
FIG. 3 is a high-level flowchart, similar to that of FIG. 1, but additionally showing functionality in accordance with the invention.

FIG. 3 is a high-level flowchart, comparable to that of FIG. 1, and having similarly numbered steps in common with FIG. 1. However, in accordance with the invention, FIG. 3 additionally shows steps 20 and 22, which record, in the profile, information pertaining to the activity of steps 6 and 10, respectively. Also, step 10 (receive and display the downloaded Web page) is replaced by a more elaborate step 11, which additionally generates the user help information, either by extracting it directly from the stored profile or by extracting raw stored information from the profile and computing the statistics and generating the user help information on the fly.

Also in accordance with the invention, an additional step 9 of detecting a user command to see the user help information from the profile is given. Responsive to detection of such a user command, the system generates and displays the user help information (step 23).

The profile information is stored in the storage 18, processed as described below, and used in support of the user's current and future activities. Note that the statistics in the profile may be pre-computed for later use at the time at which the activity takes place, or, alternatively, only the fact of the activity having taken place may be recorded in the profile. In this latter case, the statistics required for the profile information are calculated on the fly at the time when, responsive to user command or spontaneously by the system, the profile information is to be displayed fr the user's use.

In accordance with the invention, the information pertaining to the various occurrences of steps 20 and 22 is processed. Skilled programmers will recognize that the processing can take place on an ongoing basis, being updated as each successive activity (step 20 or 22) takes place. However, for clarity of presentation, it will be assumed that the processing is handled separately.

Figure 4:
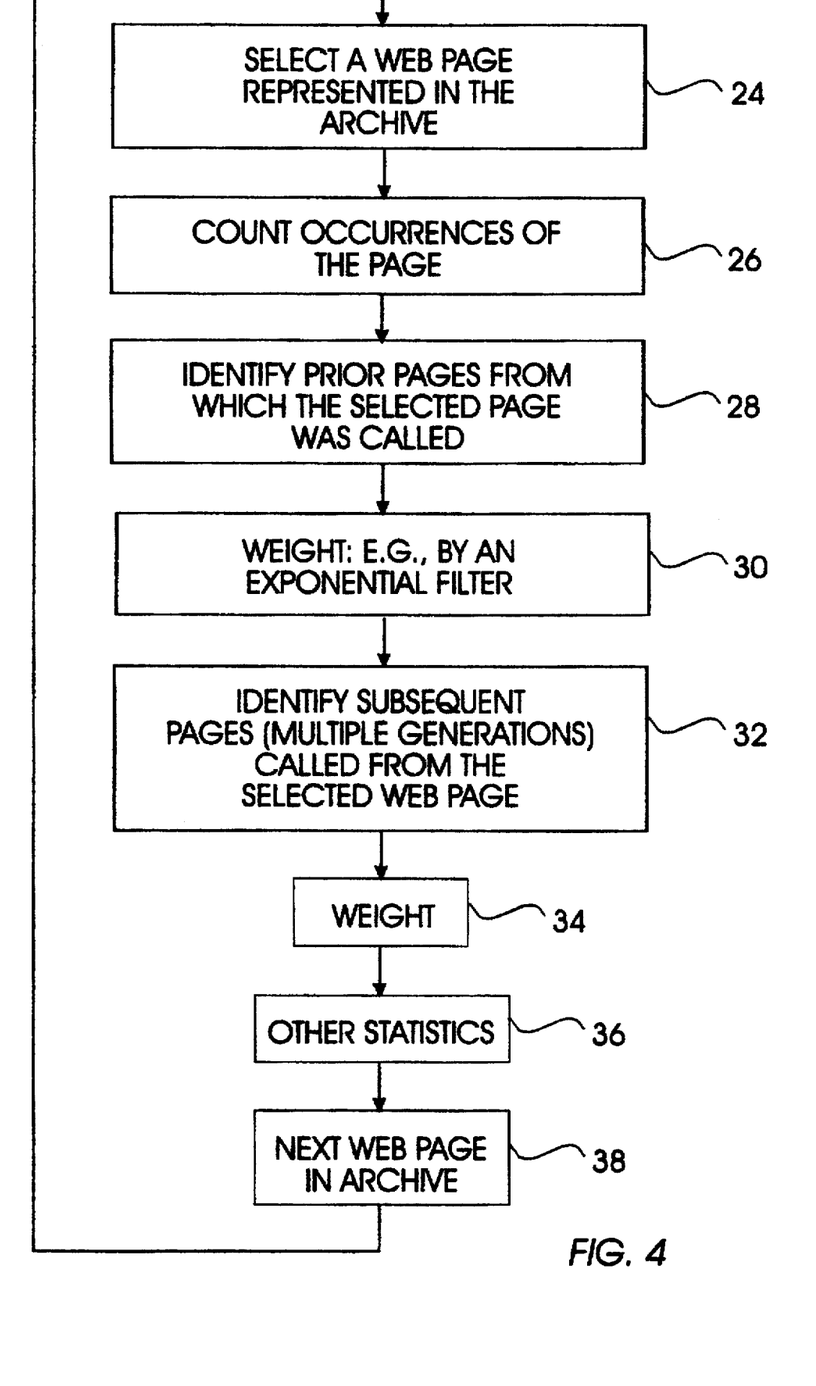
FIG. 4 is a detailed flowchart showing functionality in accordance with the invention.

FIG. 4 is a flowchart which presents this processing in a concise descriptive form.

In general, it is assumed that the information needed by the user is a function of the current state of the local node 16, that is, which Web page is currently being displayed. The profile will contain a history of past visitations (i.e., downloadings) of that same Web page, and the various other pages that the user went to, from this page.

Accordingly, it is preferred that the stored information is processed, and statistics are computed, on a per-current-Web-page basis. First, in step 24, a Web page is selected. (note that the Web page selection referred to here is not to be confused with the selection and downloading by the user of the Web page, unless this processing is done concurrently with the selection of the Web page by the user. It is anticipated that these two events will normally not be concurrent.)

In step 26, the number of occurrences of the page, i.e., the number of times in the past that this Web page has been downloaded, is computed. Preferably, the date and time of the prior downloads, or some suitable indication of how recently each download took place, is also obtained, and used later.

In step 28, the information stored in the profile is further processed to determine, for each past download, where else on the Web the user was located. Accordingly, if there is a given other Web page from which the user repeatedly came to this page, that other Web page will be so identified.

In step 30, the occurrences of the current Web page and of the other Web pages are weighted. Preferably, an exponential filter weight function is used, to give suitably greater weight to more recent events.

Similarly, step 32 identifies other Web pages that, is prior Web surfing sessions, the user went to from the current Web page. These occurrences are also weighted according to how long ago they took place (step 34).

Note that steps 28 and 32 preferably work backward and forward more than one generation. That is, step 32 preferably determines not only what other Web pages the user went to from the current Web page, but what further Web pages he/she went to from those other Web pages.

Other statistics are obtained as necessary or appropriate (step 36). Since steps 28 and 32 review a history of past activities to identify associations and sequential patterns between accessed Web pages, skilled programmers and database system analysts will recognize that these steps are performing activities analogous to the activity becoming known as "data mining."

Finally, after all desired statistics are computed for the selected Web page, another Web page is selected (step 38), and the process is repeated.

As the user surfs the Web, the information thus obtained may be presented in an informative way, to assist the user in his/her further activities. Display of the information can be either in response to a user command, or at the initiative of the system. For instance, under appropriate circumstances, such as a given elapsed length of time without an input command, the system displays a representation of the statistics thus obtained.

Alternatively, this spontaneous display can be implemented as an annotation to an existing Web page image (i.e., by inserting additional text and/or links), by means of a separate "page", giving results of the computation responsive to the user's request, or as a separate window, text, or audio responsive to detection by the system of new information that would involve updating the profile.

As the system operates during a user Web surfing session, the above-generated statistics are used to facilitate the user's choices of functions to command. The following activities may preferably take place as part of the idle step 2 in FIG. 3.

Figure 5:
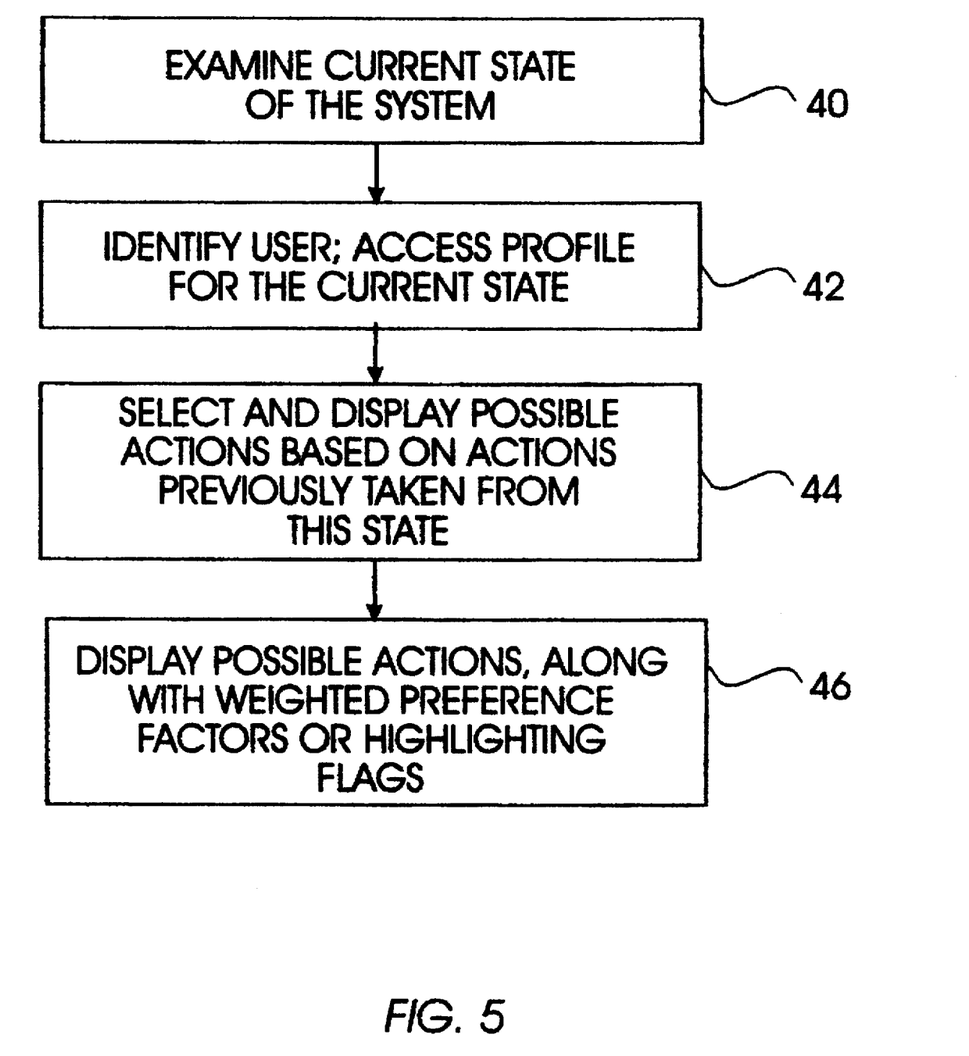
FIG. 5 is a detailed flowchart showing further functionality in accordance with the invention.

In step 40, the current state of the system, i.e., which Web page is currently being displayed, is obtained or otherwise noted. The profile (that uniquely associated with the current user) is accessed (step 42).

A display of the possible actions that the user might take is generated, in suitable format (step 44), and displayed (step 46). Preferably, step 46 also includes a display of information pertaining to the weighting factors computed in steps 30 and 34.

Figure 6:
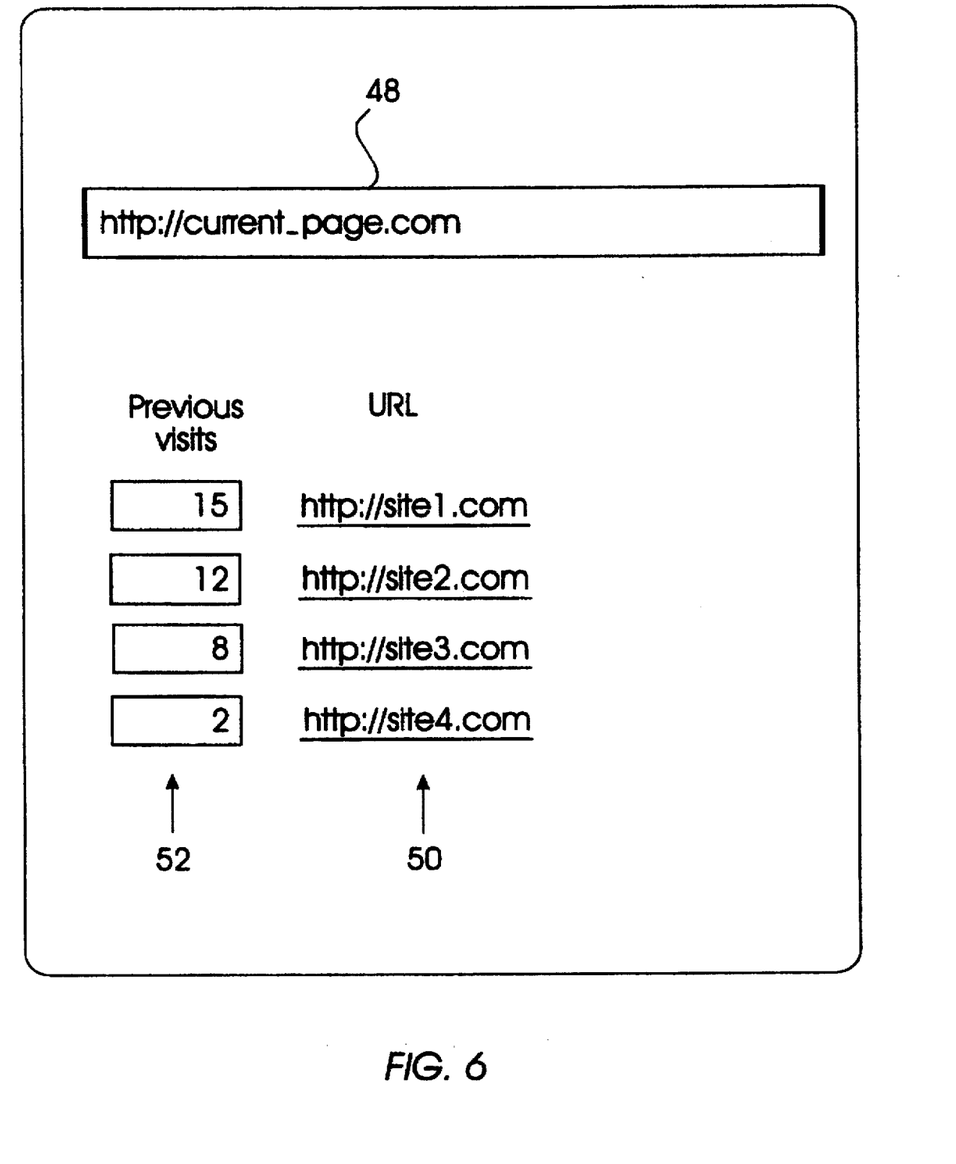
FIG. 6 is a simplified example of a user interface showing information displayed in accordance with the invention, as per FIG. 5.

An example of such a display is shown in FIG. 6. FIG. 6 is a simplified representation of a Web page. A current URL display 48 shows the URL of the currently-displayed page, in typical fashion. Also displayed are a set of URLs for other Web pages which, in the past, the user has gone to from this one. The pages themselves are shown as URLs 50. Alternatively, icons, descriptive texts, etc., may be displayed. Also in accordance with the invention, information pertaining to the statistics are shown. For instance, separate displays, generally shown as 52, are given, preferably adjacent to the respective URLs, showing the number of past occurrences. These may be given in ranked order, as shown, based on the decreasing number of past occurrences.

To prompt the user to select one of these other Web pages, the URLs 50 are preferably hyperlinks. Accordingly, easy access to the other pages, by way of a single mouse click, is facilitated.

Predicted links may also be represented as icons, or be shown as highlighted, colored a contrasting color, etc.

While FIG. 6 presents this information essentially in passive form, it is also possible for the system to take initiative in the selection of the further action.

Figure 7:
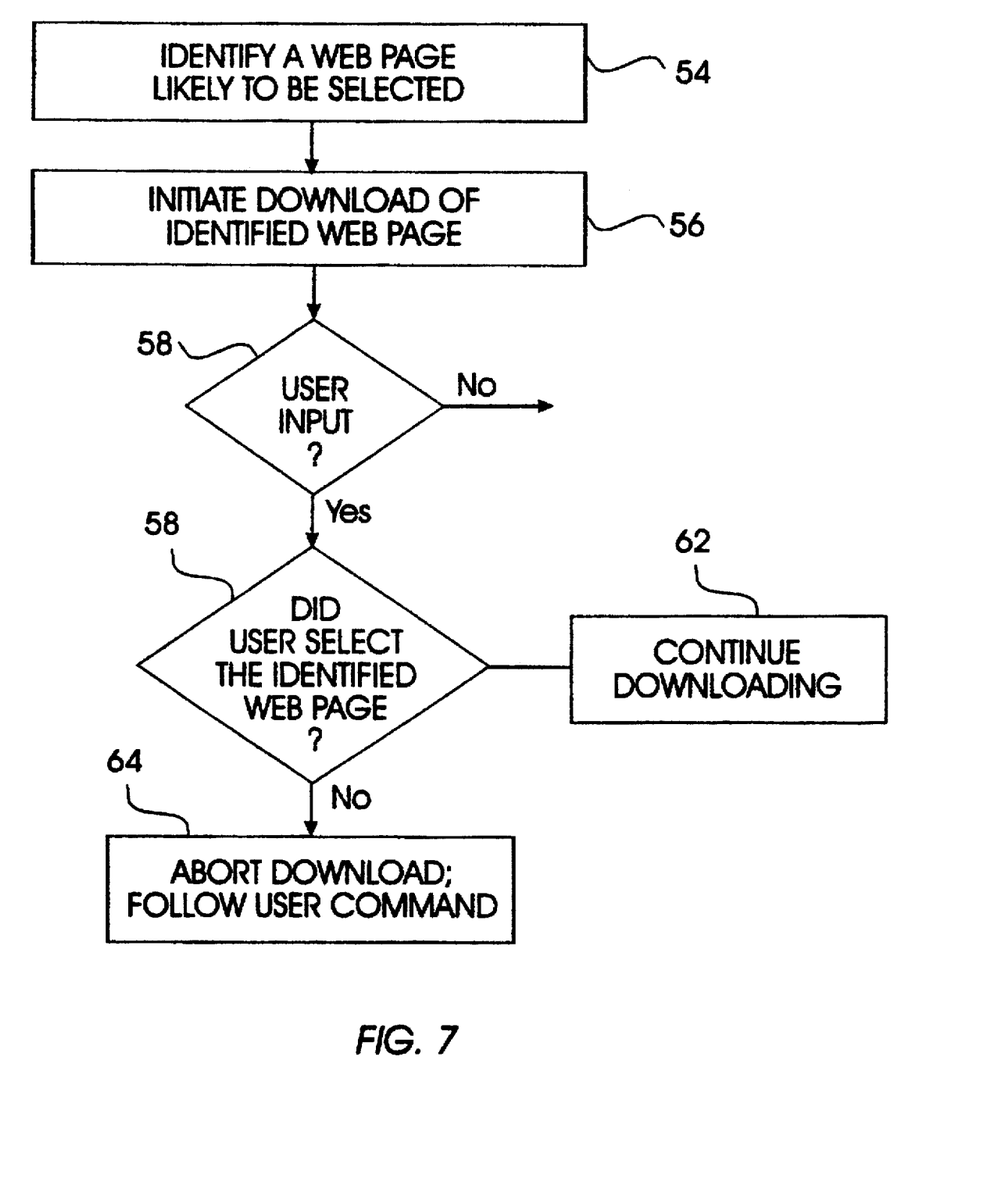
FIG. 7 is a detailed flowchart showing further functionality in accordance with the invention.

FIG. 7 shows a preferred technique for doing this. First, in step 54, a Web page likely to be selected is identified. This may be done by taking the most frequently occurring page, or by other suitable means such as weighting past occurrences according to how recently they took place.

After identifying a likely Web page, the system initiates a download (step 56). Thus, while the user is considering what action to take next, the download is already commencing. If in fact the user selects that Web page (steps 58 and 60), the downloading continues, but is that much closer to completion (step 62). If, on the other hand, some other Web page is selected, then the current downloading is aborted, and the actual user command is responded to (step 64).

Figure 8:
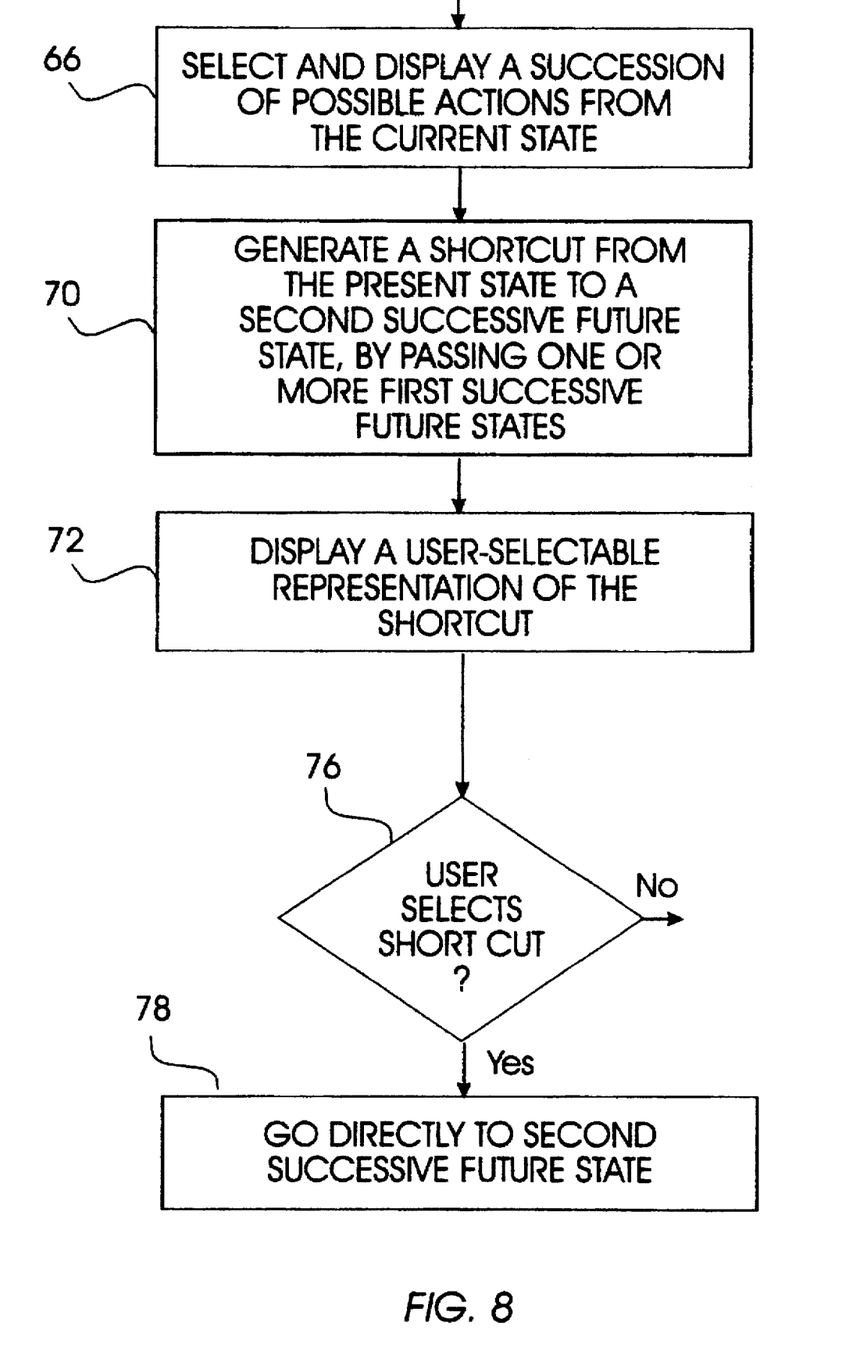
FIG. 8 is a detailed flowchart showing further functionality in accordance with the invention.

FIG. 8 shows an embodiment of the invention comparable to that of FIG. 5, but showing additional preferred functionality. Following steps 40 and 42, executed as described above, FIG. 8 goes to step 66, to display a succession of possible actions to and from the current state.

Figure 9:
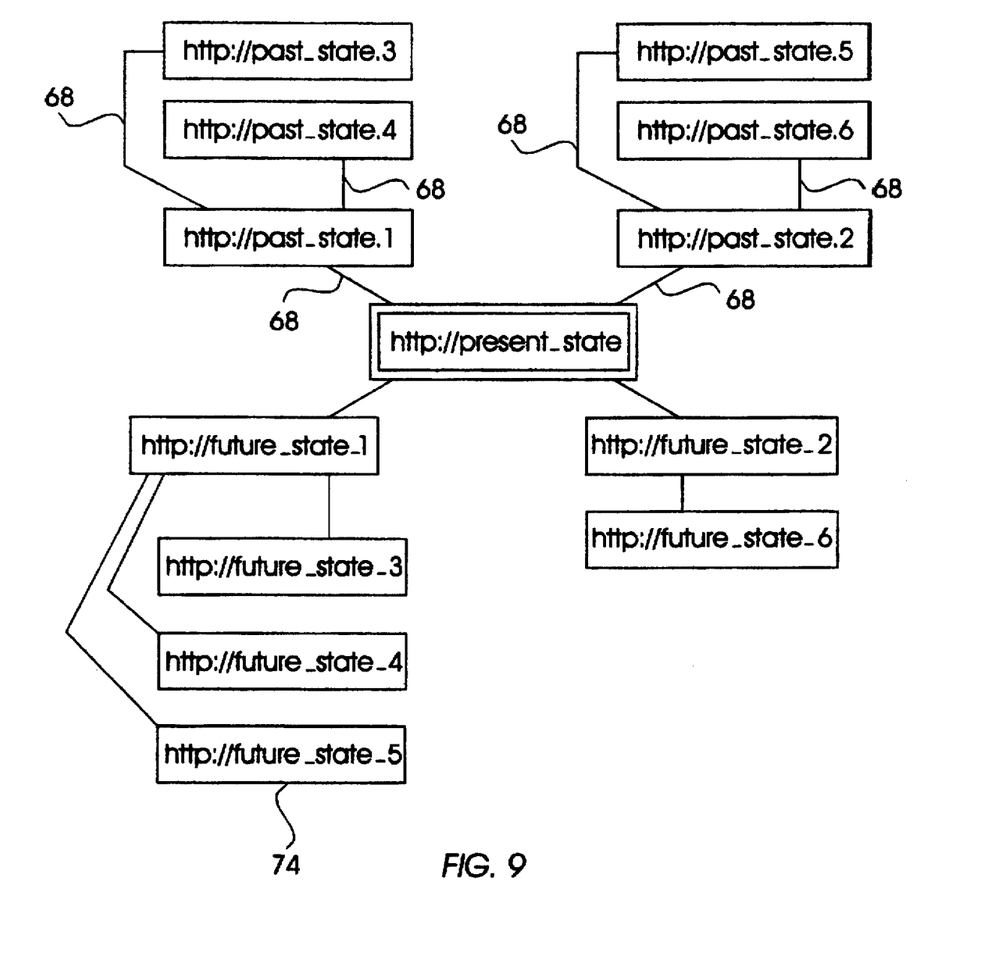
FIG. 9 is a simplified example of a user interface showing information displayed in accordance with the invention, as per FIG. 8.

FIG. 9 is an illustration of a possible display in accordance with FIG. 8. In FIG. 9, it is assumed that the currently displayed Web page is that identified by the URL "http://present_state". For this example, the profile showed that this page has previously been reached from two other pages, whose URLs are "http://pas_state_" and "http://past_state_2". Each of these previously viewed pages have, in turn, two pages viewed before them, as shown. For the chronological relationships, connectors are shown, generally numbered as 68. Because of the general graphical approach of showing the current page and pages previously download soon before or after the current page, this might be referred to as a "Local Trail" display.

Similarly, the profile showed that, from the current page, the user has, in the past, gone to two other pages, whose URLs are "http://future_state_1" and "http://future_state_2". Also, the pages the user had previously gone to from those are shown.

Returning now to the flowchart of FIG. 8, in accordance with the invention a shortcut is identified, to "skip a generation" and allow the user to go directly to one of the last-mentioned pages.

The previously executed sequence of downloads may generally be described as "user actions." If a sequence of such user actions were made, in a previous session, from a current user state in which the presently displayed Web page was itself previously displayed, then it may be said that those user actions are "earlier" or "later" than each other, depending on the order in which the user made them in the earlier session. Thus, the concept of "shortcut" as discussed herein is understood to mean fgoing directly to a later user action without an intervening earlier user action. That is, from the current state, the shortcut allows the user to directly download a later Web page, without first doenloading an earlier Web page in the same sequence the user followed in the previous session.

For instance, suppose that the user wanted to go directly from the current page to "http://future_state_5". Based on the hyperlinks appearing in the pages, the user might conventionally have to go to "http://future_state_1" first. However, in accordance with the invention, the shortcut of step 70 is provided for the user's direct use (step 72).

In the example of FIG. 9, the graphical representation of the URLs shows the generational relationships in terms of the chronological connectors 68. Thus, the user can see that "http://future_state_5" is two generations past the present page, by way of "http://future._state_1".

As shown in step 72, the shortcut is provided in terms of a user-operable selection means 74. In this preferred embodiment of the invention, the displayed URL "http://future_state_5" is itself a system-generated hyperlink, which allows the user to go directly to that page by clicking on that hyperlink (steps 76 and 78). Thus, the additional time and user effort involved in downloading "http://future_state_1" is avoided.

Note that, while this example shows a skipping of only one generation, to go directly from "http://present_state" to "http://future_state_5", any desired number of successive generations may be skipped in the same manner. Thus, where past sessions have been lengthy, involving a long succession of successive Web page downloads, the ability to skip several generations by using a single shortcut is a powerfully advantageous feature for user convenience.

Figure 10:
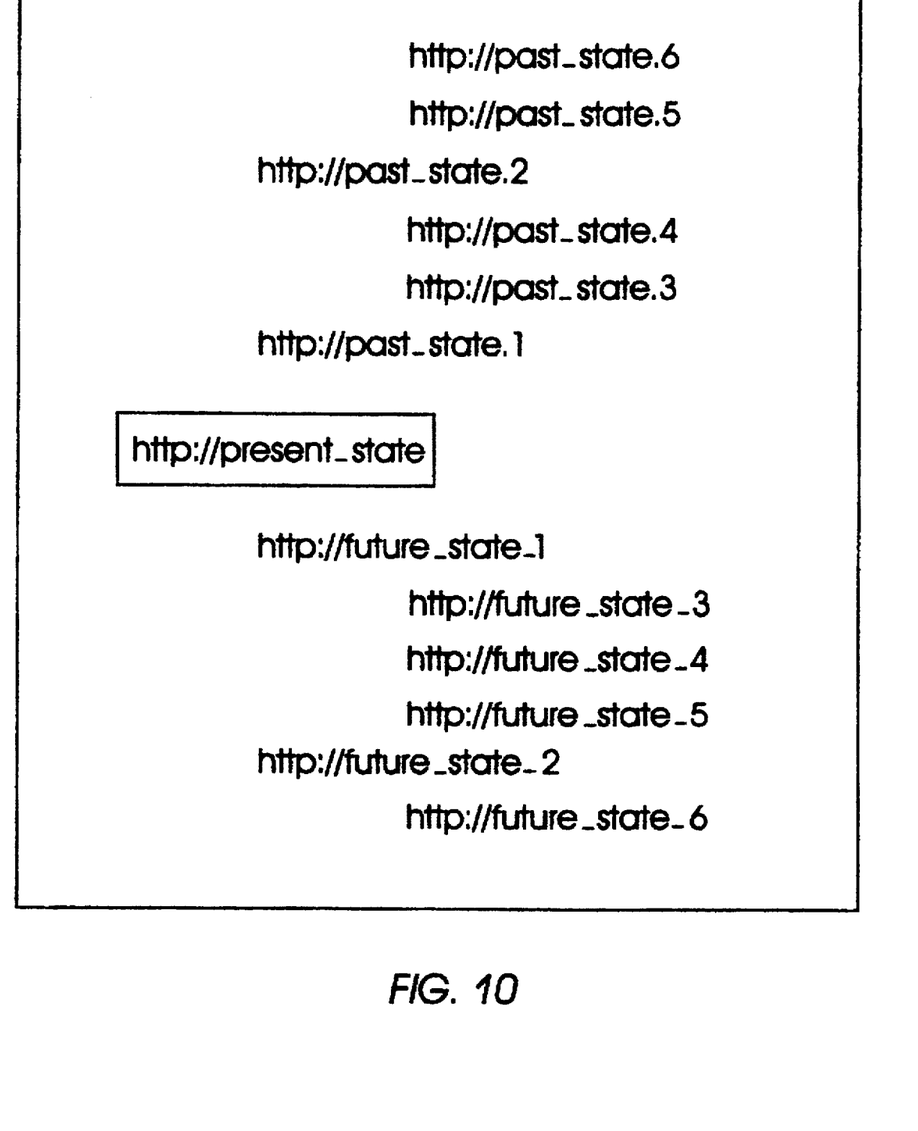
FIG. 10 is another simplified example of a user interface showing information displayed in accordance with the invention, as per FIG. 8.

FIG. 10 is a simplified illustration of another Local Trail display, showing the same Web page visitation history as that of FIG. 9. In FIG. 10, instead of a tree structure of nodes and links defining the chronological relationship, an indentation scheme is used. The presently displayed Web page is shown, by URL, in the middle of FIG. 10 as the left-most item. Each successive past or future generation is indented a successively great distance to the right. Functionally, FIG. 10 is substantially the same as FIG. 9.

Figure 11:
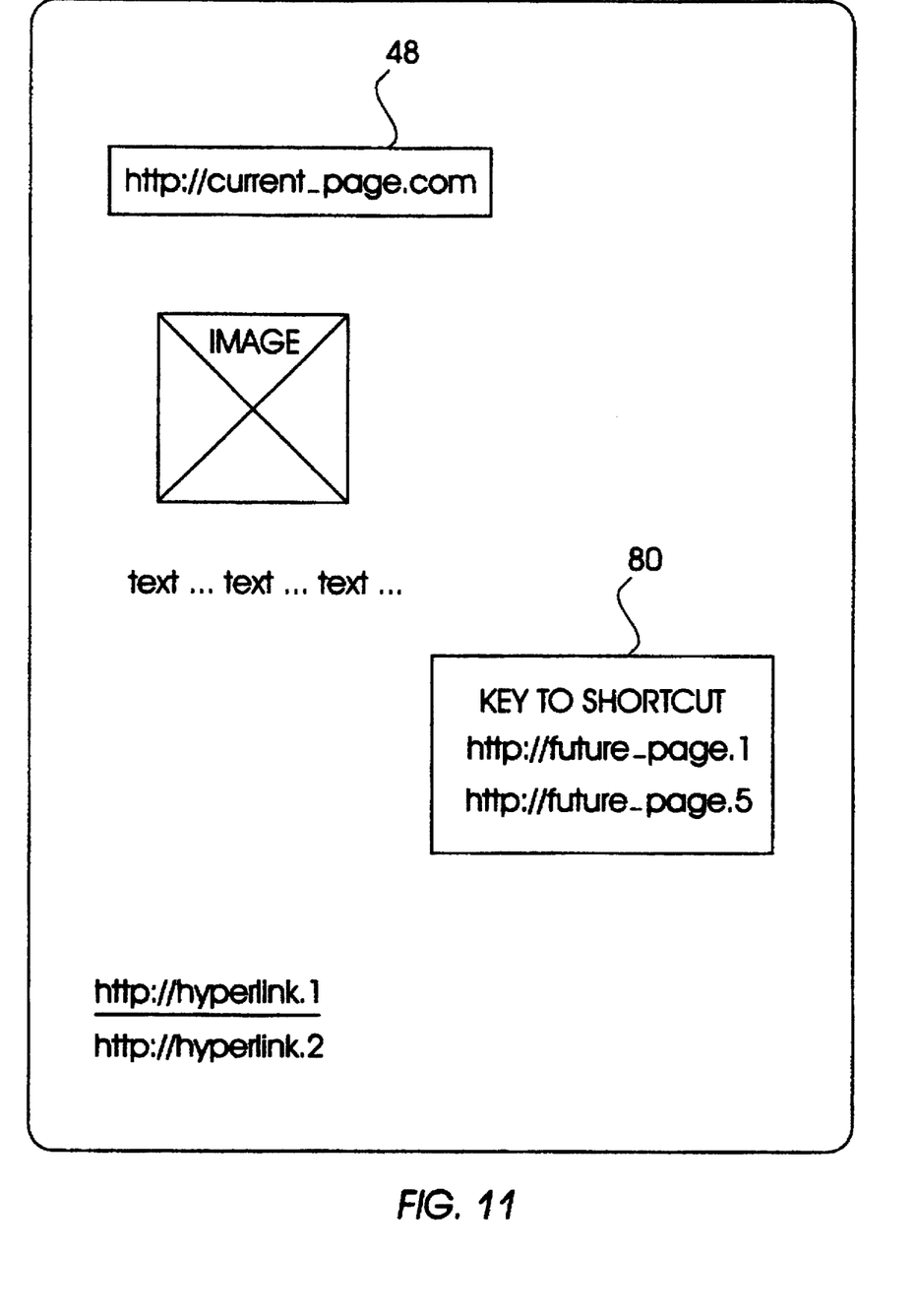
FIG. 11 is another simplified example of a user interface showing information displayed in accordance with the invention, as per FIG. 8.

A short cut can also be provided without requiring the display of a separate page, such as that shown in FIGS. 9 and 10. Rather, as shown in FIG. 11, a short cut can be added in the form of a key 80, which is superimposed on the currently downloaded Web page, rather than being displayed separately. For the illustrated example, the profile indicates that the user has a history of going from "http://current_page.com" to "http://future$_{13}$ page_1", and from there to several pages, including "http://future_page_5". If these pages are predicted future user choices, such as by being the most popular past choices, then the key 80 is provided. Both of the URLs are hyperlinks, so, as before, the user can short-cut directly to "http://future_page_5" by clicking on that hyperlink in the key.

While the examples given have shown all contiguous items downloaded, from the currently displayed one to the one for which the shortcut is sought, it is also possible to omit one or more of the intermediate items, and display only a subset of them in the fashions given in the examples. Those items which are omitted may preferably be omitted based on factors such as their overall infrequency of accessing in the profile of the past history of user activities. Also, those displayed may be shown differently, e.g., using different colors, fonts, etc., to further convey to the user their relative frequency of use in the profile.

Another form of information displayed by the system in accordance with the invention might be referred to as an "Instant Hot List." This is a list of previously visited pages, comparable to the conventional "hot list" such as IBM's Quick List, but which includes a ranking based on a suitable factor, such as numbers of previous visitations, or visitations weighted by time proximity. An Instant Hot List is global to the user, rather than being specific to the currently displayed page. Unlike the conventional hot lists, the items are listed in ranked order, as shown, for instance, in FIG. 6. The pages are listed, in a suitable form such as by URLs 50, accompanied by the ranking information 52. Note, also, that while items are conventionally added to Hot Lists by express user command, an Instant Hot List in accordance with the invention lists all sites previously visited.

Using the foregoing specification, the invention may be implemented using standard programming and/or engineering techniques using computer programming software, firmware, hardware or any combination or subcombination thereof. Any such resulting program(s), having computer readable program code means, may be embodied or provided within one or more computer readable or usable media such as fixed (hard) drives, disk, diskettes, optical disks, magnetic tape, semiconductor memories such as read-only memory (ROM), etc., or any transmitting/receiving medium such as the Internet or other communication network or link, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A communication system for facilitating communication between a user and a network of information resources at respective remote network nodes, the system comprising:

a local node having a user interface program thereon, for allowing a user to interface with the network and request a download of information items from the information resources;

a network interface coupled between the local node and the network;

a user interface including (i) means for receiving user commends representative of user actions and (ii) means for displaying received network responses of network information for viewing by a user;

means for recording a sequence of successive user actions and network responses;

means for developing a profile of user activities based on the user actions and network responses monitored in the step of monitoring; and means for actively facilitating user activities based on the developed profile.

2. A system as recited in claim 1, wherein the means for developing a profile includes means for storing in an archive and processing the sequence of successive user actions and network responses.

3. A system as recited in claim 2, wherein the means for developing a profile includes computing, for each document, (i) a number of times the document was previously downloaded, (ii) statistics regarding what other information items were downloaded prior to the given information item, and (iii) statistics regarding what other information items were downloaded after the given information item.

4. A system as recited in claim 1, further comprising means for predicting the user's likely next request based on the profile and on a current system state reflective of a most recent user action.

5. A system as recited in claim 1, wherein the means for actively facilitating includes means for selecting an information item that the user is likely to want to download based on the profile.

6. A system as recited in claim 5, wherein the means for actively facilitating further includes means for downloading the information item that the user is likely to want, responsive to operation of the means for selecting.

7. A system as recited in claim 1, wherein the means for actively facilitating includes means for displaying a representation of the profile.

8. A system as recited in claim 7, wherein the means for displaying a representation of the profile is operable responsive to a user command.

9. A system as recited in claim 7, wherein:

the means for actively facilitating further comprises means for determining, based on a current state of the system and on a recent user action, that the user might find it useful to see the representation; and the means for displaying is operative responsive to the determination, by the means for determining, that the user might find it useful to see the representation.

10. A system as recited in claim 9, wherein the means for actively facilitating further includes means, operable responsive to operation of the means for determining, for calculating the statistics based on the information stored in the profile.

11. A system as recited in claim 7, wherein the means for displaying further includes means for displaying representations of previously loaded information items based on the statistics.

12. A system as recited in claim 11, wherein the means for displaying further includes means for displaying representations of previously loaded information items in a fashion which shows a sequence in which the information items were loaded.

13. A system as recited in claim 12, wherein the means for displaying includes means for displaying one of:

(i) a contiguous sequence of previously loaded information items, and (ii) a subset of a contiguous sequence of previously loaded information items, the items of the subset being included therein based on the statistics.

14. A system as recited in claim 11, wherein the means for displaying representations includes displaying the representations using an indenting scheme to show the sequence in which the information items were loaded.

15. A system as recited in claim 11, wherein the means for displaying includes means for displaying a graphical image of a structure having nodes representing previously loaded information items and connectors therebetween, representing a sequence in which the information items were loaded.

16. A system as recited in claim 7, wherein the means for actively facilitating includes means for facilitating user selection of a next user activity based on the displayed representation of the profile.

17. A system as recited in claim 1, wherein the means for actively facilitating includes means for displaying representations of a set of alternative possible user actions and respective statistics regarding past use of the alternative possible user actions.

18. A system as recited in claim 17, wherein the means for displaying respective statistics includes means for displaying statistics weighted according to one of (i) a number of past occurrences of the user action, and (ii) how recently in the past the occurrences took place.

19. A system as recited in claim 18, wherein the means for displaying statistics includes means for displaying the statistics based on an exponential filtered weighting.

20. A system as recited in claim 5, wherein:

the means for actively facilitating includes:
    means for displaying representations of a sequence of successive user actions based on the profile, the successive user actions including an earlier and a leter subsequent user action, the later subsequent user action having been made, in a previous session, subsequent to the earlier subsequent user action, which, in turn, was made in the earlier session subsequent to the present user action, and
    means for facilitating a shortcut from a present state to the later user action, bypassing the earlier user action; and
the means for displaying includes means for displaying a user-selectable representation of the shortcut.

21. A method for facilitating communication between a user and a network of information resources at respective remote network nodes, the user having:

a local node having a user interface program thereon, for allowing a user to interface with the network and request a download of information items from the information resources, a network interface coupled between the local node and the network, a user interface including (i) means for receiving user commends representative of user actions and (ii) means for displaying received network responses of network information for viewing by a user, the method comprising the steps of:
    recording a sequence of successive user actions and network responses;
    developing a profile of user activities based on the user actions and network responses monitored in the step of monitoring; and
    actively facilitating user activities based on the developed profile.

22. A computer program product, for facilitating communication between a user and a network of information resources at respective remote network nodes, for use with a user communication system including:

a local node having a user interface program thereon, for allowing a user to interface with the network and request a download of information items from the information resources, a network interface coupled between the local node and the network, and a user interface including (i) means for receiving user commends representative of user actions and (ii) means for displaying received network responses of network information for viewing by a user, the computer program product comprising:
    a computer-usable medium;
    means, recorded on the medium, for directing the user communication system to record a sequence of successive user actions and network responses;
    means, recorded on the medium, for directing the user communication system to develop a profile of user activities based on the user actions and network responses monitored in the step of monitoring; and
    means, recorded on the medium, for directing the user communication system to actively facilitate user activities based on the developed profile.

* * * * *

UNITED STATES PATENT AND TRADEMARK OFFICE
CERTIFICATE OF CORRECTION

PATENT NO. : 5,727,129  
APPLICATION NO. : 08/659100  
DATED : March 10, 1998  
INVENTOR(S) : Robert Carl Barrett, Daniel Clark Kellem and Paul Philip Maglio Page 1 of 1

It is certified that error appears in the above-identified patent and that said Letters Patent is hereby corrected as shown below:

In the Abstract, line 2, delete "at" and replace it with --as--.

In Column 5, line 24, delete "commends" and replace it with --commands--.

In Column 7, line 25, delete "fr" and replace it with --for--.

In Column 9, line 52, delete "fgoing" and replace it with --going--.

In Column 9, line 53, delete "earilier" and replace it with --earlier--.

In Column 9, line 55, delete "doenloading" and replace it with --downloading--.

In Column 11, line 60, delete "commends" and replace it with --commands--.

In Column 13, line 25, Claim 20, delete "leter" and replace it with --later--.

In Column 14, line 4, Claim 21, delete "commends" and replace it with --commands--.

In Column 14, line 26, Claim 22, delete "commends" and replace it with --commands--.

Signed and Sealed this

Eighth Day of April, 2008

JON W. DUDAS  
*Director of the United States Patent and Trademark Office*